July 8, 1969  O. HARKE  3,454,082
VALVE-CONTROLLED MIXING WITH UPSTREAM HEAT EXCHANGER
Filed Aug. 4, 1967

INVENTOR
Otto Harke
BY
ATTORNEYS.

United States Patent Office 3,454,082
Patented July 8, 1969

3,454,082
**VALVE-CONTROLLED MIXING WITH
UPSTREAM HEAT EXCHANGER**
Otto Harke, 50—26 64th St., Woodside, N.Y. 11377
Filed Aug. 4, 1967, Ser. No. 658,537
Int. Cl. F28f 3/10
U.S. Cl. 165—166    12 Claims

ABSTRACT OF THE DISCLOSURE

Hot and cold water are separately passed through a plate-type heat exchanger so that the water temperature of each becomes more nearly equal. The fluids then pass through individual flow control valves to a mixing chamber where they are mixed. The combined water, which is now at a more comfortable temperature, departs from an outlet means.

BRIEF DESCRIPTION OF THE INVENTION

This invention is a fluid supply system which has hot and cold fluids from different supply conduits flowing to a mixer, and the rate of flow in each of the conduits is controlled by valve means that are operable to change the flow in one conduit with respect to that in the other. Ordinarily the valve means includes two separate valves, but the invention can be used with combination valves where a single handle controls both the hot and cold fluid, and the rate of flow with respect to one another.

The principal object of the invention is to reduce the difference in the temperatures of the hot and cold fluids before they reach the mixer so that adjustment of the valve means to obtain a particular temperature is less critical. The invention is particularly useful for shower baths. When attempting to adjust the temperature of the water discharged from a shower head, it is difficult to get the desired comfortable temperature when the difference between the temperature of the hot and cold water is great and the water pressure is substantial. Minute changes in the position of either valve shift the temperature of the mixed water from too hot to too cold, or vice versa. The invention will be described as applied to a shower bath, but it will be understood that it can be used for other supply systems having hot and cold fluids that flow to a mixer.

This invention brings the temperature of the water in the hot and cold water pipes closer together by passing the hot and cold water through a heat exchanger before they are brought together in the mixer. Changes in the rate of flow of either the hot or cold water has less effect on the temperature of the mixture, and the adjustment of either valve is, therefore, less critical. A comfort range for the mixed water is obtained over a substantial range of valve positions.

The preferred construction has the valves downstream from the heat exchanger so that partitions dividing the hot and cold water from one another in the mixer are subject to substantially the same pressure on both sides, instead of widely differing pressure ratios, as occurs on the downstream side of the valves, especially if one valve is fully closed.

Another object of the invention is to provide a heat exchange that transfers large quantities of heat quickly, even though the apparatus is of small size. The preferred construction of the heat exchanger includes a stack of plates with clearance between them except at two opposite sides where the successive partitions touch one another. The clearance closed on two sides provides a flow passage in one direction between successive plates of the stack. Alternate plates for the clearance passages extend in different directions, preferably at right angles to one another. A housing provides chambers at opposite ends of the flow passages extending in one direction and other chambers at opposite ends of the flow passages that extend in the other direction. Hot fluid flows through one group of passages and cold fluid through the other.

The plates are made of heat-conducting material, preferably metal such as aluminum or copper. The heat conductivity of the metal is over one hundred times the heat conductivity of water and by having the clearance between the plates narrow, a heat transfer is effected at a rapid rate, especially as compared to a system where heat has to be conducted through water to other water. A shower can be operated to advantage with a heat exchanger having plates of about one square inch in a stack less than six inches long. This example is given merely by way of illustration.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DETAILED DESCRIPTION OF THE INVENTION

Figure 1:
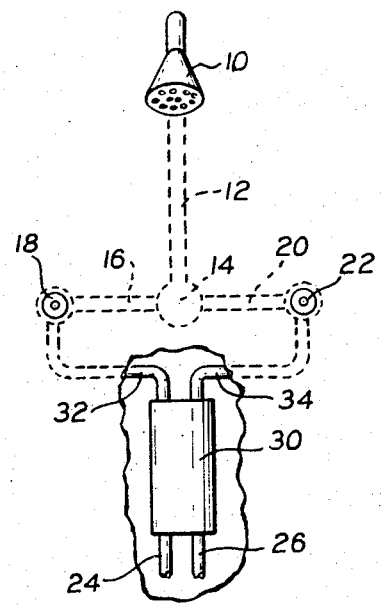
FIGURE 1 is a diagrammatic piping diagram showing a shower equiped with a heat exchanger in accordance with this invention.

FIGURE 1 shows a conventional shower head 10 to which water is supplied through a pipe 12 from a mixer 14. Hot water is supplied to the mixer 14 through piping 16 commanded by a hot water valve 18; and cold water is supplied to the mixer 14 through piping 20 commanded by a cold water valve 22. The hot water flows to the valve 18 from a hot water supply pipe 24 and cold water is supplied to the valve 22 from a cold water supply pipe 26.

The hot and cold water supply pipes 24 and 26, respectively, are connected with the upstream end of a heat exchanger 30 and the hot water side of the heat exchanger 30 is connected with the valve 18 through connecting piping 32; while the cold water side of the heat exchanger 30 is connected with the valve 22 through piping 34.

When the valves 18 or 22 are open, the water flowing to each valve through the heat exchanger 30 has its temperature changed in the heat exchanger to a temperature nearer to that in the supply line for the other valve. The hot water reaching the valve 18 is at a lower temperature and the cold water reaching the valve 22 is at a higher temperature as the result of exchange of heat between hot and cold water chambers in the heat exchanger 30, the construction of which will be more fully explained in connection with FIGURES 5–7.

Figure 2:
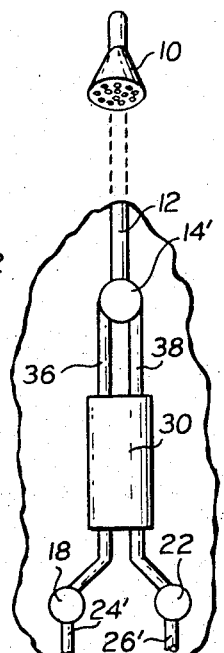
FIGURE 2 is a view similar to FIGURE 1 but showing a modified form of the invention with the control valves upstream from the heat exchanger.

FIGURE 2 shows the shower head 10 connected by a pipe 12 to a mixer 14'. This mixer 14' receives hot and cold water from the heat exchanger 30 through piping 36 and 38 which corresponds to the piping 32 and 34 of FIGURE 1 except that there are no valves in the piping 36 and 38.

The hot water for the heat exchanger 30 is supplied in FIGURE 2 from a supply line 24' and the cold water is supplied to the heat exchanger in FIGURE 2 from a cold water supply pipe 26'. These supply pipes 24' and 26' correspond with the supply pipes 24 and 26 of FIGURE 1 except that the hot water control valve 18 commands the supply pipe 24' and the cold water control valve 22 commands the cold water supply pipe 26'.

The different modifications shown in FIGURES 1 and 2 operate on the same principle in exchanging heat between the hot and cold water before it reaches the mixture. The important difference is that the heat exchanger 30 is on the upstream side of the valves 18 and 22 in FIGURE 1; and it is on the downstream side of the valves 18 and 22 in FIGURE 2. This means that the water pressure in the different chambers of the heat exchanger 30 in FIGURE 1 remains substantially the same at all times and substantially equal in both the hot and cold water chambers since the water pressure is always the pressure at which water is supplied to the valves 18 and 22.

In FIGURE 2, however, the water pressure in the heat exchanger 30 varies over a wide range depending upon the rate of flow as determined by the extent of opening of the valve 18 or the valve 22. If either of the valves 18 or 22 is closed, then the water pressure in the chambers of the heat exchanger which are supplied through that valve are approximately zero; and the water pressure on the other side of the heat exchange partitions may be substantial if the other valve is open to any great extent.

Figure 3:
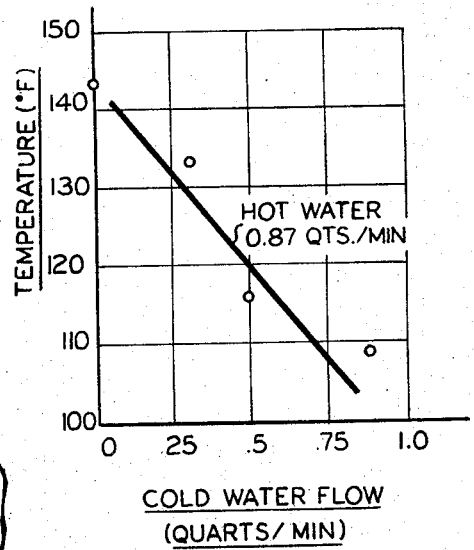
FIGURE 3 is a graph showing the variation in temperature of the water when using this invention for different rates of flow.

FIGURE 3 shows the operation of the water supply systems of FIGURES 1 and 2. The graph shown in FIGURE 3 represents the variation in the temperature of the hot water when the rate of flow of the hot water is constant, but the rate of flow of the cold water varies.

For example: the temperature of the hot water in FIGURE 3 is approximately 143° F. before it reaches the heat exchanger. This is the temperature at which the hot water will be discharged from the heat exchanger if there is no flow of cold water through the heat exchanger, neglecting such heat losses as may occur through the piping and metal of the heat exchanger. When the cold water flow amounts to slightly more than 0.25 quart per minute, the hot water coming from the heat exchanger drops approximatelp 10°, i.e., to about 133° F. A further increase in the cold water flow to about 0.5 quart per minute drops the hot water exit temperature to approximately 117° F., and when the cold water flow is increased to about .87 quart per minute, the same rate of flow as the hot water, the temperature of the hot water drops below 110°.

It will be evident that the temperature of the cold water increases as the temperature of the hot water decreases since the loss of heat of the hot water is principally to the cold water; and similar graphs can be drawn showing the variation of the temperature of the cold water, and families of graphs can be drawn showing the variations at various flow rates for both of the hot and cold water. For purposes of this description, however, it will be apparent that the adjustment of the water temperature becomes much easier with the temperature of the hot water reduced from 143° to less than 110° and with the temperature of the cold water raised. If a person is adjusting a shower for a temperature of 100°, it is evident that adjustment of the hot water faucet becomes much less critical when the hot water is only slightly hotter than the desired temperature of the mixture; and similarly, where the cold water has been raised to a temperature only slightly less than that desired for the mixture.

It will be evident, however, that this invention does not limit in any way the extremes to which the water temperature can be raised or lowered, since the cool water can be shut off entirely or the hot water shut off entirely and after a brief delay, the other water remaining in the heat exchanger will be fully heated or cooled so that it no longer has any effect upon the flowing water.

Figure 5:
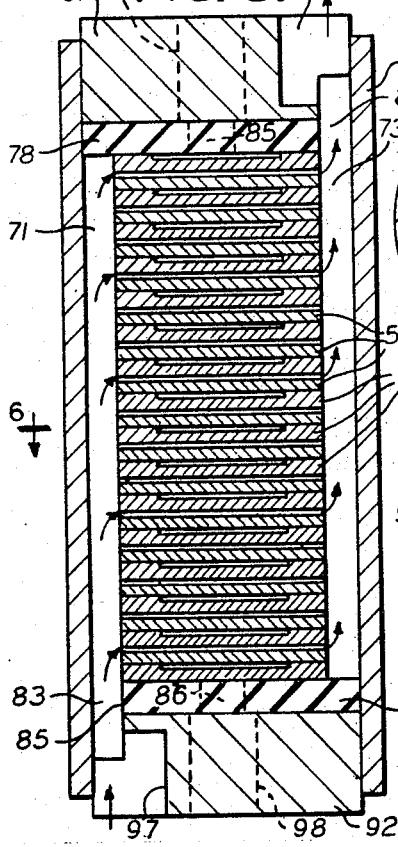
FIGURE 5 is a sectional view taken on the section line 5—5 of FIGURE 4.
Figure 6:
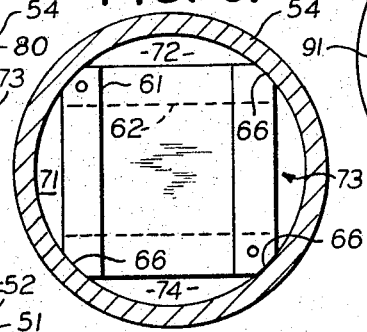
FIGURE 6 is a sectional view taken on the section line 6—6 of FIGURE 5.
Figure 4:
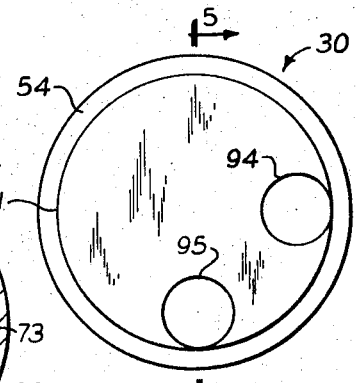
FIGURE 4 is a top plan view, on a greatly enlarged scale, of the heat exchanger shown in FIGURES 1 and 2.

FIGURES 4–6 show the preferred construction of the heat exchanger 30. There are a plurality of plates 51 and 52 in a housing 54. The plates 51 and 52 are generally square with their corners cut off, and the housing 54 is a cylindrical tube. All of the plates 51 and 52 are preferably of similar construction but they are alternate plates and oriented at right angles to one another and the plates 51 have openings 56 in different corners and corresponding openings 58 in the plates 52.

Figure 7:
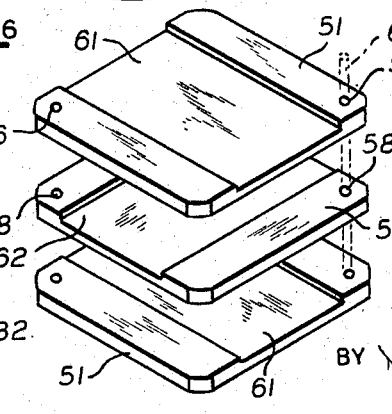
FIGURE 7 is a fragmentary, isometric, exploded view showing some of the plates of the heat exchanger shown in FIGURES 5 and 6.

FIGURE 7 shows one of the plates 51 with a channel 61 extending across it. This channel is formed in the top surface of the plate 51 and the bottom surface is preferably plane.

FIGURE 7 shows a plate 52 located under the upper plate 51 and having a channel 62 which corresponds to the channel 61 of the plate 51 except that it extends at right angles to the channel 61. When the plate 51 is placed on top of the plate 52, the only clearance between the plates is through the channel 62. A lower plate 51 located under the plate 52 in FIGURE 7 has a channel 61 which provides the only clearance between the plate 52 and the bottom plate 51 when these plates are brought into contact with one another. The plates 51 and 52 are held in alignment with one another by rods 64 which pass downward through the openings 56 and 58.

When the stacks of plates 51 and 52 are located in the cylindrical housing 54, as shown in FIGURE 6, the cut-off corners of the plates contact with the inside surface of the housing 54 at the location indicated in FIGURE 6 by the reference character 66. The stack of plates thus divides the interior of the housing 54 into four chambers 71, 72, 73 and 74.

The chambers 71 and 73 communicate with one another through the channel 62; whereas the chambers 72 and 74 communicate with one another through the channel 61.

The chambers 71 and 72 are the hot water chambers and the chambers 73 and 74 are the cold water chambers.

As shown in FIGURE 5, there is a partition 78 at the top of the stack of plates with an opening 80 through which water flows from the chamber 73. This partition 78 closes the upper end of the chamber 71, but there is a corresponding partition 82 at the bottom of the stack with an opening 83 through which water flows into the chamber 71. In similar manner, there is an opening 85 for the discharge of water from the chamber 72 and an opening 86 for the entrance of water into the chamber 74.

The opposite ends of the housing 54 are closed by end fittings 91 and 92. The end fitting 91 has passages 94 and 95 communicating with the openings 80 and 85. Similarly, there are openings 97 and 98 in the bottom fitting 92 communicating with the openings 83 and 86 of the partition 82.

From the description of the heat exchanger it will be apparent that the water passing through the heat exchanger travels through narrow channels so that the water paths are parallel and of thin cross section. This reduces to a minimum the amount of heat conduction through the water itself and increases to a maximum the amount of heat conduction which takes place through metal. This is advantageous because the heat conductivity through the metal is over one hundred times as great as the heat conductivity through water. The construction shown in FIGURES 4–7 is economical to manufacture because of the use of similar multiple plates and because of the small size required. For large heat exchange the plates can be secured together by bonding or adhesive, if desired, but clamping is usually sufficient and some minute leakage between the different chambers, if it occurs, is not objectionable.

The width of the sub-chambers between partitions is correlated with the elasticity of the materials of which the partitions are constructed so that with complete loss of pressure in one of the chambers, the deformation of the partitions brings the sub-chambers into contact with one another at less than the elastic limit of the material of which the partitions are constructed.

What is claimed is:

1. A fluid supply system including a hot fluid supply conduit, a cool fluid supply conduit, valve means for controlling the rate of flow and for shutting off the flow of fluid in the conduits, the valve means being operable to change the flow in one conduit with respect to the other, a fluid mixer to which fluid is supplied by both of the conduits, and a heat exchanger in the system upstream from the mixer, the heat exchanger having two chambers therein, the chambers having a plurality of partition sections separating them from one another, the partition sections between the chambers having a heat conductivity greater than that of the fluid with which the heat exchanger is intended to be used, one of the chambers being part of the hot fluid supply line and the other chamber being part of the cool fluid supply line.

2. The fluid supply system described in claim 1 characterized by the heat exchanger being located on the upstream side of both of the valves so that the partition of the heat exchanger is subjected on both sides to the upstream pressure on the respective valves.

3. A fluid supply system including a hot fluid supply conduit, a cool fluid supply conduit, valve means for controlling the rate of flow and for shutting off the flow of fluid in the conduits, the valve means being operable to change the flow in one conduit with respect to the other, a fluid mixer to which fluid is supplied by both of the conduits, and a heat exchanger in the system upstream from the mixer, the heat exchanger having two chambers therein separated by a partition having good heat conductivity, one of the chambers being part of the hot fluid supply line and the other chamber being part of the cool fluid supply line, characterized by the fluid supply system being part of a shower bath having a shower head to which water is supplied from the mixer, the valve means including separate valves for regulating hot and cold water, and the heat exchanger having chambers of thin cross section so that the water flows through the heat exchanger in streams of thin dimensions in a direction normal to the surface of the partition between the chambers, said partition having a heat conductivity over one hundred times higher than that of water to bring the water controlled by the different valves nearer to the same temperature.

4. The fluid supply system described in claim 1 characterized by the path of the hot fluid across the partition section of the heat exchanger being in a different direction from that of the cold fluid.

5. The fluid supply system described in claim 4 characterized by the flow of the different fluids across opposite sides of the partition sections being substantially at right angles to one another.

6. The fluid supply system described in claim 1 characterized by the heat exchanger having a stack of sub-chambers, alternate one of which communicate with and form part of the hot fluid chamber, and others of which connect with and form part of the cold fluid chamber.

7. The fluid supply system described in claim 6 characterized by the heat exchanger including a stack of plates which as spaced from one another across their width in one direction to leave clearance for flow of fluid between them, and which are in contact with one another along both sides of said clearance to prevent flow of fluid in another direction, alternate plates having their clearances for flow extending in different directions, the clearance between plates providing said sub-chambers of the heat exchanger, and housing means covering the ends of the different plates and having fluid flow clearances and forming with said clearances the complete chambers of the heat exchanger.

8. The fluid supply system described in claim 7 characterized by the housing means being a tube which surrounds the plates and with which each of the plates contacts at four locations around the perimeter of each plate, the points of contact of each plate with the tube being at a location where there is no clearance between the plates and forming a separation of one chamber of the heat exchanger from the other chamber.

9. The fluid supply system described in claim 7 characterized by the plates being of the same size and contour, and alternate plates being disposed at right angles to one another about the longitudinal axis of the stack in which they are assembled.

10. The fluid supply system described in claim 8 characterized by the housing means being a round tube and the plates being substantially squared and stacked with corresponding sides in alignment, but the plates having rounded corners that are adjacent to the inside wall of the tube for blocking flow of fluid from the normal segmental cross sectional portions of the chamber beyond the flat sides of the plates.

11. The fluid supply system described in claim 10 characterized by openings through diagonally opposite corners of the plates and pins extending through the openings and holding the plates in stacked alignment with one another.

12. The fluid supply system described in claim 6 characterized by the width of the sub-chambers between partitions being correlated with the elasticity of the materials of which the partitions are constructed so that with complete loss of pressure in one of the chamber, the deformation of the partitions brings the sub-chambers into contact with one another at less than the elastic limit of the material of which the partitions are constructed.

References Cited

UNITED STATES PATENTS

| 2,983,487 | 5/1961 | MacKay | 236—12 XR |
| 3,091,393 | 5/1963 | Sparrow | 236—12 XR |
| 3,129,723 | 4/1964 | Straka | 4—194 XR |
| 3,217,788 | 11/1965 | Adam | 165—36 XR |

FRED C. MATTERN, JR., *Primary Examiner.*

MANUEL ANTONAKAS, *Assistant Examiner.*

U.S. Cl. X.R.

236—12; 4—192